Aug. 14, 1945.  J. D. LANGDON  2,382,427
SIPHON BREAKER AND VALVE
Filed Sept. 9, 1941
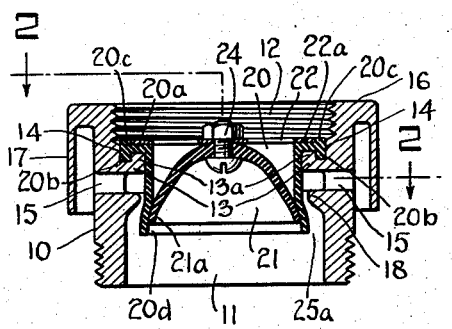
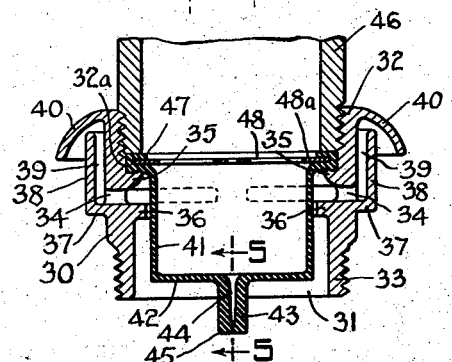
INVENTOR
Jesse D. Langdon
HIS ATTORNEY Patented Aug. 14, 1945

2,382,427

UNITED STATES PATENT OFFICE 2,382,427

SIPHON BREAKER AND VALVE

Jesse D. Langdon, Los Angeles, Calif.

Application September 9, 1941, Serial No. 410,139

6 Claims. (Cl. 137—69)

This invention relates to siphon breakers for interconnection with piping systems supplying water or other fluid to an outlet which is a potential source of back-flow. Such siphon breakers prevent back-flow into the piping system from the outlet by establishing communication with the atmosphere through suitably provided air vents if and when a vacuum occurs or tends to occur in the supply portion of the piping system.

The present application constitutes a continuation in part of my co-pending application Serial Number 347,673, filed July 26, 1940, now Patent No. 2,270,737, granted January 20, 1942, for "Siphon breakers and valves," which itself constitutes a continuation in part of my co-pending application Serial Number 326,090, filed March 26, 1940, now Patent No. 2,270,838 granted January 20, 1942, for "Siphon breakers and valves."

The siphon breakers disclosed in my above-mentioned applications, and in the present application, each comprises, in general, a valve casing provided with air vents, and a flexible, expansible, lip-provided, check valve secured within the valve casing for freely permitting flow of fluid in the direction of supply while maintaining the air vents closed, and for preventing return of fluid in the reverse direction, while maintaining the air vents open, in the event of suction occurring in the supply line.

A primary object of the present invention is to position and maintain the flexible check valve in substantially the center of the main-flow passage through the valve casing so as to eliminate the possibility of accidental closure of any of the air vents by an off-center condition.

Another object is to so construct the valve casing as to cooperate most effectively with the flexible valve in the centering thereof, and in the closing of the air vents thereby.

Another object is to provide the flexible check valve in such manner that the lips thereof will tend to wrap around any foreign object that might lodge therebetween for minimizing leakage through the lips when in closed position, and, further, so that reversal of the flexible check valve under back pressure will be prevented.

A further object is to prevent undue spurting of fluid through the air vents, and to prevent outward seepage of moisture condensation from such air vents.

A feature of the invention in the attainment of the above objects resides in the provision of means for expanding that portion of the flexible valve which engages the valve casing for securement thereto, and for maintaining such expanded portion in expanded condition.

A feature resides in the provision of wall means in the valve casing for cooperation with the expanded engaging portion of the flexible valve.

Another feature resides in the provision of a sealing ring interiorly of the valve casing and extending into the main flow passage thereof below the air vents for cooperation with the flexible valve in closing the air vents and for directing fluid away from the same.

A further feature resides in the provision of a sump exteriorly of the valve casing and adjacent the air vents for guarding against outflow of moisture from the valve casing.

Further objects and features of the invention will be apparent from the following detailed description of specific embodiments of the invention illustrated in the accompanying drawing.

In the drawing:

Fig. 1 represents an embodiment of the invention wherein one form of means for centering the flexible valve and one form of cooperative valve casing are illustrated completely assembled and ready for installation in a piping system, the view being a central vertical section;

Fig. 2, a view taken on the line 2—2, Fig. 1;

Fig. 3, a view corresponding in the main to that of Fig. 1, but illustrating another embodiment of the invention wherein a sump is included as a part of the valve casing, and wherein the component elements are different in form and somewhat differently arranged;

Fig. 4, a bottom plan view of the embodiment of Fig. 3;

Fig. 5, a fragmentary view in vertical section taken on the line 5—5, Fig. 3, and showing only the flexible check valve;

Fig. 6, a view corresponding in the main to those of Figs. 1 and 3, but illustrating another embodiment of the invention wherein the component elements are different in form and differently arranged;

Fig. 7, a perspective view of the valve and centering means, per se, of the embodiment of Fig. 6, and Fig. 8, a detail view of another embodiment of flexible check valve and spider, the view corresponding to that of Fig. 3.

The embodiment of Fig. 1 is of a type wherein the valve casing is formed in one piece, preferably a machined metal casting. This piece is adapted, preferably by screw threads, for connection, at its lower end, with piping leading directly to the outlet fixture, and, at its upper end, with the supply piping. Usually the supply piping will be the outlet end of a flush valve, while the outlet fixture will be a water closet bowl, the siphon breaker being included for the purpose of preventing back-flow, into the supply system, of contaminated fluid from the closet bowl.

The valve casing 10 of the embodiment of Fig. 1 has a main flow passage 11, the upper end of which is defined by internal threading 12 adapted for mating with external threading of the supply piping or flush valve (not shown). The lower end of the valve casing 10 is externally threaded for mating with internally threaded outlet piping.

An annular shoulder 13, extending internally of the valve casing intermediate the length of main flow passage 11, has a raised edge portion 13a defining a groove, and serves to receive the flexible valve. A circumferential wall portion 14, immediately above the shoulder 13, provides a relative smooth facing against which the engaging portion of the flexible valve is pressed for the purpose of centering such flexible valve.

If the internal threading 12 is fine, it is not absolutely necessary to provide the smooth wall facing 14 to achieve proper centering, although such smooth wall facing 14 is desirable in all instances.

Ports 15 are formed at intervals through the casing, circumferentially thereof and immediately below the shoulder 14, providing air vents.

A rim 16 extends outwardly about the upper end of the casing, and a circumferential apron 17 drops downwardly from the outer edge of the rim for protecting the air vents.

Immediately below the air vents, a second annular shoulder 18 extends internally of the valve casing 10, and provides a sealing ring and baffle for seating the lower portion of the flexible valve during normal supply of fluid through the piping system. The underside of the shoulder 18 advantageously slopes gradually upwardly to better seat the flexible valve of the type employed in this embodiment.

The flexible check valve is preferably formed of rubber, but may be formed of other flexible materials which are not necessarily resilient, since the water pressure itself is the primary actuating force in the opening and the closing of the valve.

In this instance, the flexible check valve is comprised of two coacting parts, an outer flexible sleeve 20 and an inner flexible bell-shaped element 21.

The flexible sleeve 20 is provided at its upper end with an outwardly extending circumferential flange 20a formed with a depending circumferential bead 20b and an upstanding circumferential bead 20c. The lower bead 20b defines a groove which receives the raised edge portion 14a of the valve casing shoulder 13, and the upper bead 20c defines a circumferential angular seat for receiving an expansion ring in the form of a circular spider element 22. As is illustrated, the spider element 22 is inset into the seat defined by the bead 20c of the flexible valve. The rim 22a of the spider element is made slightly larger in its outer diameter than the diameter of its seat, and, therefore, expands the circumferential flange 20a of the flexible valve sleeve so that it presses tightly against the circumferential wall portion 14 of the valve casing and thus establishes an accurate centering of the flexible valve relative to the flow passage 11.

The rim 22a of the spider is connected to a central hub 22b by radial spokes 22d, thus providing apertures 23 for the passage of fluid. In the present instance, there are four spider spokes providing quarter-segment apertures. As thus formed, the spider guards against any possibility of reversal of the flexible check valve under extraordinary conditions of back-pressure or valve deterioration.

The bell-like flexible valve part 21 is secured to the hub 22b of the spider 22, conveniently by means of a screw and nut assembly, as is indicated generally at 24, an opening being provided centrally thereof for that purpose. Its rim extends downwardly, and the circumferential lip 21a thereof normally seats against the lower slightly flared circumferential lip 20d of the flexible sleeve 20, the two circumferential lips 21a and 20d thus parallelling each other circumferentially at the lower end of the flexible check valve.

When fluid is flowing from the supply end to the outlet end of the main flow passage 11, the sleeve 20 is distended outwardly into sealing pressure contact with the circumferential sealing ring 18, while the bell-like part 21 is pressed downwardly and inwardly, thus providing free passage for the supply fluid and effectively sealing the air vents against discharge of fluid therethrough. If and when a vacuum occurs, or tends to occur, at any time in the supply piping, the sleeve 20 is drawn inwardly against the circumferential lip 21a of the bell-like valve part 21, as illustrated, thus, tightly closing the main flow passage 11 against back flow of fluid from the outlet fixture. Under such circumstance, the air vents 15 are open for dissipating any vacuum condition that might exist on the outlet side of the flexible valve.

The embodiment of Figs. 3, 4 and 5 is similar in many respects to that of Figs. 1 and 2. As illustrated, this siphon breaker is actually connected to supply piping. The valve casing 30 is of one piece construction having a main flow passage extending therethrough, and an internally threaded supply end 32, as well as an externally threaded outlet end 33. Ports, or air vents, 34 are provided through the walls of the casing intermediate the two ends thereof, and a circumferential valve-engaging shoulder 35 extends internally of the casing immediately above the air vents, while a circumferential sealing ring and baffle 36 extends similarly, immediately below the air vents.

In this embodiment a sump is provided circumferentially and externally of the valve casing adjacent the air vent openings 35. A circumferential wall 37 extends outwardly externally of the valve casing at the level of the air vent openings, and said wall merges with a relatively high up-standing circumferential wall 38 which extends upwardly from the outer edge of the circumferential wall 37. As is shown in Fig. 3 the height of the wall 38 is several times the height of the air ports 34. In this manner, a sump-pocket 39 is formed circumferentially of the valve casing in communication, at its lower end, with the air vent openings 34, and having relatively long and narrow top opening providing communication with the atmosphere. The up-standing wall 38 of the sump is sufficiently high to prevent undue spurting of liquid from the valve casing should there be any failure of the flexible check valve, and also to catch any moisture condensation occurring externally of the valve casing adjacent the air vent openings. The sump-pocket 39 returns any moisture collected to the interior of the valve casing through the air vent openings. An outwardly and downwardly flared circumferential flange 40 extends outwardly from the upper end 32 of the valve casing forming an apron covering and protecting the sump-pocket 39.

The flexible check valve is, in this instance of Figs. 3, 4, and 5, of a somewhat different construction than that aforedescribed with respect to the embodiment of Figs. 1 and 2, but embodies the same generic features. Instead of being formed in two parts with circumferentially parallel lips, it is formed of one piece of flexible material, preferably, as in that aforedescribed, a good quality rubber to provide a sleeve portion 41—which corresponds to the sleeve 20b, aforedescribed—and a transverse diaphragm portion 42, integrally connected to the circumferential lower edges of the sleeve portion 41, preferably at right angles thereto, and forming a substantially flat bottom therefor. The resulting check valve is of cup formation.

The transverse diaphragm portion 42 includes a depending nipple portion 43 having a relatively restricted passageway 44 therethrough. The passageway 44 preferably extends throughout the width and the length of the nipple portion, from lateral wall to lateral wall and from bottom wall to the cup-opening for facilitating opening of the check valve. The bottom wall of the nipple portion 43 is slit centrally thereof and rectilinearly along the width thereof toward, but well short of, the lateral sides thereof to provide rectilinearly parallel lips 45 and 45. Such lips 45 and 45 are normally closed against each other, but, when fluid flows through the supply piping 46, they open under pressure of the fluid to provide a fluid-flow passage through the valve. If and when a vacuum occurs, or tends to occur, in the supply piping system, the lips 45 and 45 are pressed tightly together by the pressure from the outlet side of the valve. The passageway 44 is preferably of substantially uniform width, and has greater depth than the lips 45, 45, see Fig. 3, with a slight taper downwardly, and the walls of the nipple portion are preferably of a greater thickness than the walls of the sleeve portion 41 and transverse diaphragm proper 42. Constructed in this manner, the nipple portion of the flexible one-piece check valve, as well as the check valve itself, is safeguarded from reversal, i. e. turning inside out, under conditions of backpressure in the piping system, and the nipple portion 43, including the lips 45, tends to wrap around any foreign particles or objects that become lodged therein without substantial impairment of operation of the valve.

The upper portion of the sleeve 41 of the flexible check valve is re-entrantly flanged as at 47 to provide a circumferential groove for receiving the rim 48a of the spider 48, such spider being similar to the spider 22 of the aforedescribed embodiment. The flange 47 engages and rests upon the circumferential shoulder 35 with its outer circumferential face contiguous with the smooth faced circumferential wall portion 32a of the valve casing. As in the aforedescribed embodiment, the spider 48 is made slightly over-size for expanding the circumferential flange 47 of the flexible check valve and for pressing the same tightly against the circumferential wall facing 32a to establish proper centering of the valve with respect to the main fluid-flow passage 31 through the valve casing. The supply piping 46 bears down upon the circumferential flange 47 and secures the flexible check valve tightly in position.

As in the aforedescribed embodiment, in addition to its centering function, the spider 48 prevents reversal of the flexible check valve under extraordinary conditions.

The embodiment illustrated in Figs. 6 and 7 is somewhat similar to the last described embodiment of Figs. 3, 4 and 5. Its valve casing, however, is formed of two separate parts, namely, a coupling nut 50 and a tail piece 51, as is conventional in the art. The flexible check valve is similar to the flexible check valve of Figs. 3 and 4.

The coupling nut 50 serves to clamp the tail piece 51 to the supply piping 52, and, for this purpose, is provided with an internally extending circumferential shoulder 53 serving as a receiving seat for the flanged upper end 51a of the tail piece.

The upper portion of the tail piece 51 is ported as at 54 providing air vents for the valve casing, and the flexible check valve is dimensioned to fit into the tail piece so the air vents are normally left open.

The flexible check valve comprises a sleeve portion 55, a transverse diaphragm portion 56, including a nipple portion 57, and an upper, solid, flanged rim 58. The nipple 57 is somewhat differently formed than the nipple 43 of the embodiment of Figs. 3 and 4, merely indicating possible variation in formation. Its passageway 58 corresponds to the passageway 44, and its lips 59, 59 correspond to the lips 45, 45. The valve is suspended across the main flow passage of the valve casing by engagement of its flanged rim 58 with the valve casing, as in the previously described embodiments.

A spider 60 is forced into the upper end of the sleeve portion of the flexible check valve for the purpose of expanding the same and of thereby accomplishing centering of the valve as in the previously described embodiments. The spider is, in this instance, cup-shaped having a vertical circumferential wall 60a interposed between the spokes thereof and the circumferential rim 60b thereof. The vertical wall 60a and the circumferential rim 60b together form an angular circumferential groove for receiving the flanged rim portion 58 of the flexible check valve. The spider 60 is made slightly over-size for outwardly expanding the flanged rim 58 and that portion of the sleeve 55 which is immediately therebelow, see 55a. The circumferential outer face of the flanged rim 58 thus presses against the smooth circumferential wall portion 50a of the coupling nut, and the upper portion 55a of the sleeve 55 is wedged tightly between the spider 60 and the upper portion of the tail piece 51, accomplishing the desired centering of the flexible check valve with respect to the tail piece 51 so that the sleeve 55 thereof is substantially equally spaced from all of the air vent ports 54.

The supply piping 52 bears down upon the spider 60, the flanged rim 58 of the flexible check valve, and the flanged upper end 51a of the tail piece 51, securing the same tightly in place.

The lower part 61 of the coupling nut 50 forms an apron covering and protecting the air vent 54.

In both the two embodiments last described, utilizing the one-piece, cup-shaped type of flexible check valve, the sleeve portion of the valve expands under the influence of supply fluid passing therethrough, and closes the air vent ports in the same manner as the separate sleeve 20 of the first described embodiment. The sealing ring and baffle 36 of the embodiment of Figs. 3, 4, and 5 serves substantially the same purposes as the sealing ring and baffle 18 of the embodiment of Figs. 1 and 2, and, if desired, a somewhat similar sealing ring and baffle may be pressed into the tail piece 51 of the embodiment of Figs. 6 and 7, see 62.

As is illustrated in Fig. 8, the spider reversal-preventing portion, here indicated generally 65, is arranged to substantially parallel the lateral and bottom walls of the flexible check valve so as to more readily prevent reversal of the flexible check valve under extraordinary conditions. Under such circumstances, the spider has substantially the same cup-formation as the flexible check valve.

In many instances it may be desirable to form the spider from a mesh screen, this being particularly true of the spider of Fig. 8 which substantially parallels the sides and bottom of the flexible check valve element. In this latter case, liquid flowing through the spider will be forced substantially radially outward through the side walls of the screen and against the sleeve of the flexible check valve element, resulting in even tighter closing of the air vent openings of the valve casing.

Whereas this invention has been described with respect to certain specific embodiments thereof, it should be understood that various changes may be made in such specific embodiments and various other embodiments may be constructed by those skilled in the art without departing from the spirit and generic purview of the invention as set forth herein and in the following claims.

I claim:

1. A vacuum breaker and valve device comprising a valve casing having an inlet and an outlet and a tubular fluid-flow passage extending therebetween; ports formed circumferentially of said fluid-flow passage and through the walls of said valve casing at a location between said inlet and said outlet; valve-supporting means disposed internally of said valve casing and circumferentially of said fluid-flow passage adjacent said ports and between the latter and said inlet; a sealing and baffle ring disposed internally of said valve casing and extending into said fluid-flow passage circumferentially thereof adjacent said ports and between the latter and said outlet; wall means extending circumferentially of said valve casing externally thereof covering and protecting said ports, said wall means defining a circumferential opening providing communication for said ports with the atmosphere; a flexible check valve secured to said valve-supporting means and extending transversely, completely across the said fluid-flow passage, said flexible check valve comprising a flexible tubular sleeve member extending toward said outlet, past said ports and said sealing baffle ring, a transverse flexible diaphragm member cooperatively associated with said sleeve and normally closing the passage therethrough, and mutually parallel flexible lips normally maintained in closed position, but expansible under the pressure of fluid flowing through said sleeve member toward said outlet for providing passage through said valve, said sleeve member having a rim portion at one end engaging said valve supporting means, and said sleeve being adapted for lateral bulging under the pressure of fluid flowing therethrough toward said outlet so that its outer face presses circumferentially against said sealing baffle ring; and an expansion ring inset into the said sleeve adjacent the said rim portion thereof and expanding said rim portion tightly against said valve casing for centering the said flexible valve within said fluid-flow passage.

2. A vacuum breaker and valve device comprising a valve casing having an inlet and an outlet and a tubular fluid-flow passage extending therebetween; ports formed circumferentially of said fluid-flow passage and through the walls of said valve casing at a location between said inlet and said outlet; valve-supporting means disposed internally of said valve casing and circumferentially of said fluid-flow passage adjacent said ports and between the latter and said inlet; a sealing and baffle ring disposed internally of said valve casing and extending into said fluid-flow passage circumferentially thereof adjacent said ports and between the latter and said outlet; wall means extending circumferentially of said valve casing externally thereof covering and protecting said ports, said wall means defining a circumferential opening providing communication for said ports with the atmosphere; a flexible check valve secured to said valve-supporting means and extending transversely, completely across the said fluid-flow passage, said flexible check valve comprising a flexible tubular sleeve member extending toward said outlet, past said ports and said sealing baffle ring, a transverse flexible diaphragm member cooperatively associated with said sleeve and normally closing the passage therethrough, and mutually parallel flexible lips normally maintained in closed position, but expansible under the pressure of fluid flowing through said sleeve member toward said outlet for providing passage through said valve, said sleeve member having a rim portion at one end engaging said valve supporting means, and said sleeve being adapted for lateral bulging under the pressure of fluid flowing therethrough toward said outlet so that its outer face presses circumferentially against said sealing baffle ring; a relatively smooth circumferential wall-facing disposed internally of said valve casing and in cooperation with said valve-supporting means, forming a pressure seat for said upper rim portion of said sleeve member; and an expansion ring inset into the said sleeve adjacent the said rim portion thereof and expanding said rim portion tightly against said circumferential wall-facing of said valve casing for centering the said flexible valve within said fluid-flow passage.

3. A vacuum breaker and valve device as defined in claim 1 wherein the said expansion ring is in the form of a spider for guarding against any possibility of reversal of said flexible check valve under back-pressure.

4. A vacuum breaker and valve device as defined in claim 1 wherein the said flexible sleeve member of the flexible check valve is independent of the said transverse flexible diaphragm thereof, the latter being substantially bell-shaped and suspended within the flexible sleeve member, the free edges of the said sleeve member and the free edges of the said transverse diaphragm being circumferentially parallel and providing the said flexible lips.

5. A vacuum breaker and valve device as defined in claim 1 wherein the said flexible sleeve member of the flexible check valve and the said transverse flexible diaphragm thereof are formed integral one with the other, the latter intersecting the former at substantially right angles and providing a substantially flat bottom for said sleeve member, and wherein a flexible nipple member, provided with rectilinearly parallel lips, extends integrally outwardly from the said transverse diaphragm.

6. In combination, a check valve element comprising a relatively thin walled sleeve having at one end a relatively thick rim, said rim having a groove therein, and at its opposite end a bottom wall extending transversely across the sleeve, said wall having flexible coacting lips defining a normally closed slit opening, and a spider member having a flange and a basket like structure extending downwardly adjacent the side walls of said sleeve and transversely across said bottom wall in spaced relationship therewith, said flange being inset into the groove in said rim to maintain the position of said spider with respect to said check valve element.

JESSE D. LANGDON.